Dec. 24, 1929.   W. R. McDONNELL   1,740,993
VEHICLE BRAKE
Filed March 23, 1926   2 Sheets-Sheet 1
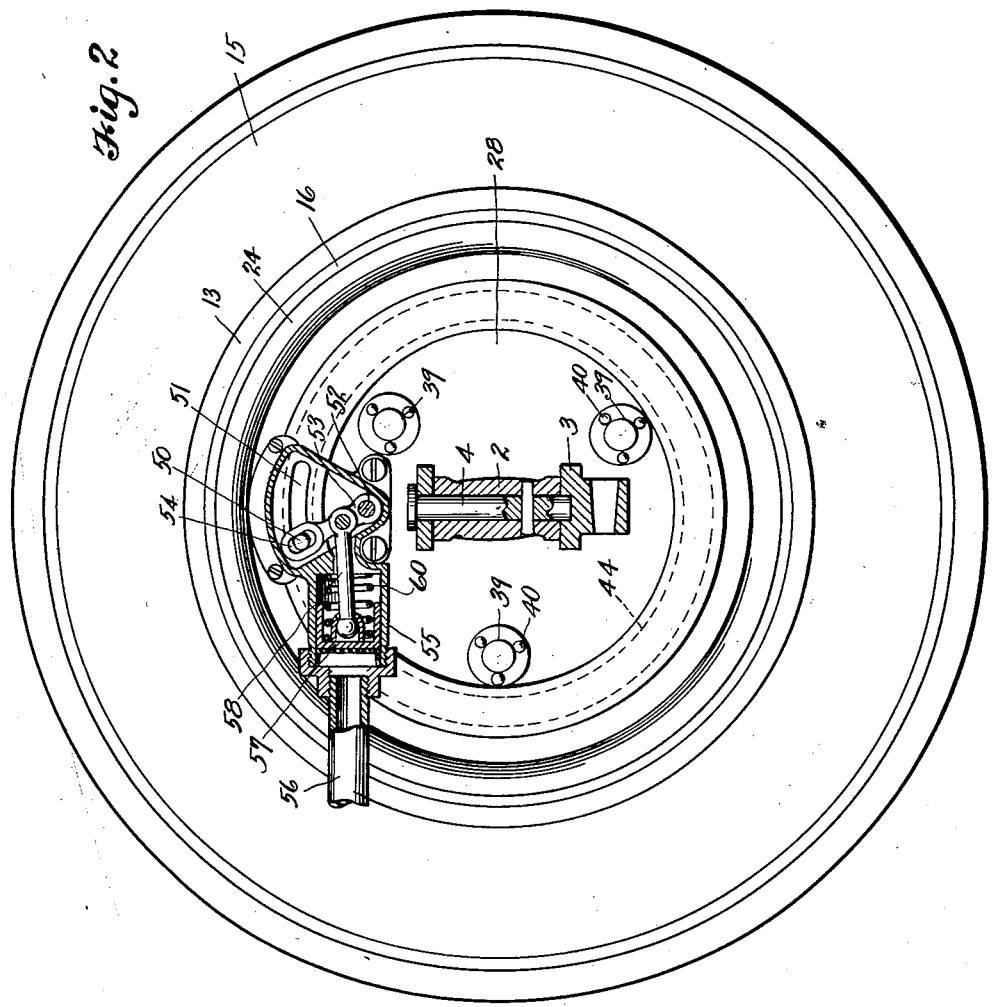
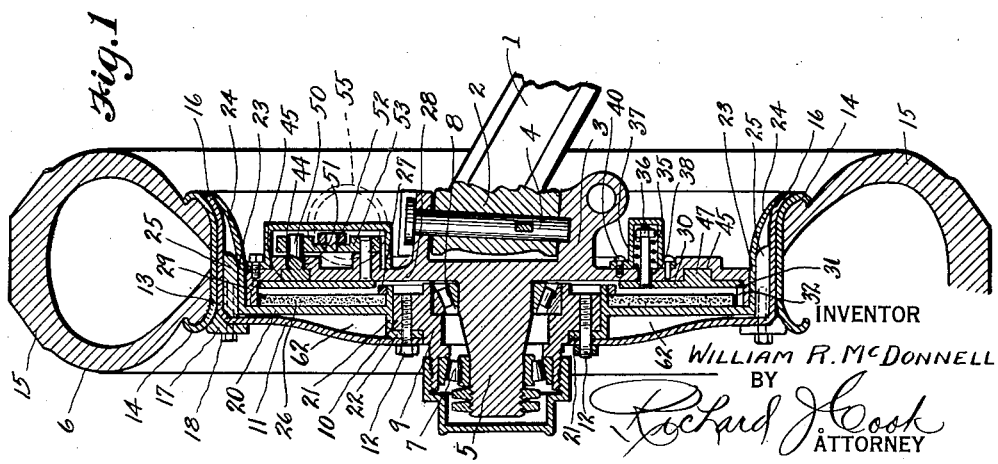
INVENTOR
WILLIAM R. McDONNELL
BY
Richard J. Cook
ATTORNEY Dec. 24, 1929.  W. R. McDONNELL  1,740,993
VEHICLE BRAKE
Filed March 23, 1926  2 Sheets-Sheet 2
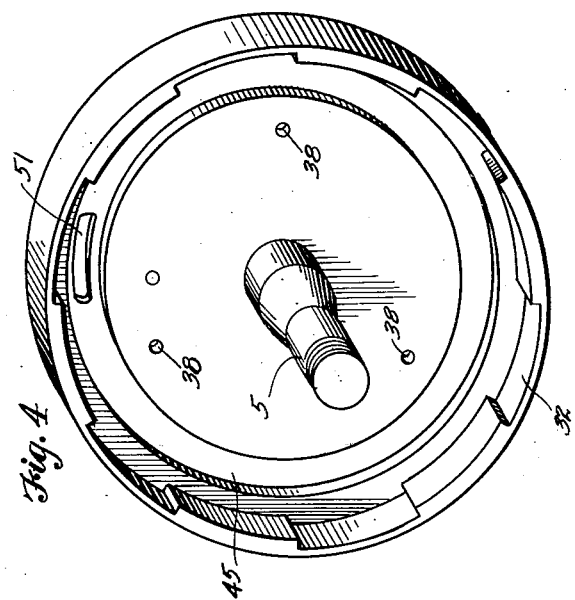
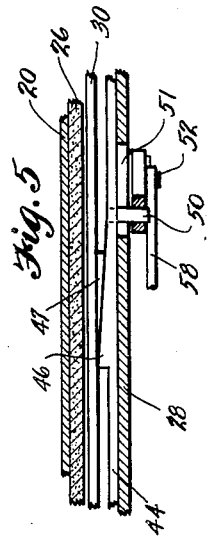
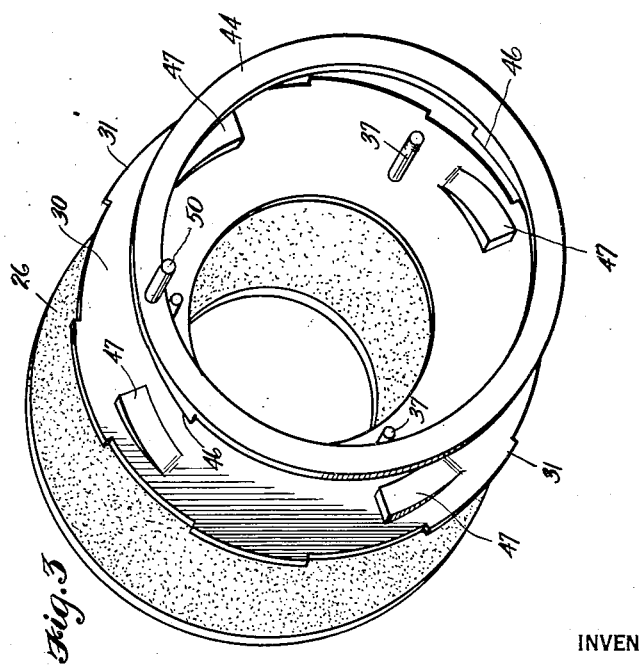
INVENTOR
*WILLIAM R. McDONNELL*
BY
*Richard J. Cook*
ATTORNEY Patented Dec. 24, 1929

1,740,993

UNITED STATES PATENT OFFICE

WILLIAM R. McDONNELL, OF SEATTLE, WASHINGTON

VEHICLE BRAKE

Application filed March 23, 1926. Serial No. 96,794.

This invention relates to improvements in brake mechanism for motor vehicles, such as automobiles, trucks and trailers; more particularly it relates to a brake mechanism wherein a disk of friction material is interposed between the base of a drum rotatably carried by a wheel of the vehicle and a nonrotative disk carried by the wheel axle; with operating means provided for clamping the latter disk against the friction material and the said material against the rotating drum so as to effect the braking action.

The principal object of the invention resides in the provision of a brake mechanism of the above character wherein the non-rotating disk has slidable, interlocking relation with a housing carried by the wheel axle and is provided with a plurality of cams adapted to be opposedly engaged by similar cams on a ring that is rotatably supported in a groove formed in the housing and is adapted to be actuated by a lever operatively connected with a hydraulically actuated piston so as to effect the clamping of the disk against the friction material.

Another object of the invention is to provide a brake assembly to which access may be easily had for repair, adjustment or replacement of parts by the removal of the wheel from its hub and without removal of the hub from its spindle.

Still another object is to provide a construction wherein the brake drum serves as a part of the wheel body and whereby the body is materially strengthened.

Still further objects of the invention reside in the various details of construction and combination of parts whereby a very efficient and durable brake mechanism is provided and which, in the combination of the wheel body and brake drum, provides for the maintaining of a cooling medium.

In accomplishing these and other objects of the invention, I have provided the improved details of construction, the preferred forms of which are illustrated in the accompanying drawings, wherein—

Figure 1 is a vertical sectional view of a vehicle wheel constructed and equipped with a brake mechanism in accordance with details of the present invention.

Figure 2 is an inside face view of the wheel and brake, showing the actuating piston and its cylinder in cross section for better illustration.

Figure 3 is a perspective view of the disk of friction material, the pressure disk and its actuating ring; the parts being shown in disassembled relation.

Figure 4 is an inside, perspective view of the brake housing, showing the groove wherein the clamping ring is contained.

Figure 5 is a sectional, detail showing the relation of the cams on the clamping ring and disk and the disposition of the friction material between the drum base and the clamping disk.

Referring more in detail to the several views of the drawings—

1 designates what may be a portion of the front axle of an automobile provided at its end with a bearing 2 on which a steering knuckle 3 is pivotally mounted by means of a pin 4. The knuckle comprises a spindle 5 on which the ground wheel, designated in its entirety by reference character 6, is mounted through the intermediacy of suitable antifriction rollers as designated at 7 and 8.

In its preferred form of construction, the wheel embodies a hub portion 9 carried by the bearings and provided with a circumferential flange 10 to which the wheel body disk 11 is secured by a plurality of bolts 12. The outer periphery of the disk 11 is turned inwardly to provide a mounting 13 for a demountable rim 14 on which a tire 15 is mounted. The rim 14 is secured in place by the outwardly flared inner edge portion 16 of the base 13 and by detachable lugs 17 secured by bolts 18 to the disk at the outer side of the rim in the usual manner.

The brake drum fits about and is also secured to the hub flange. It comprises the base, or end plate 20, provided with a hub portion 21 that fits about the flange 10 and which has an inturned rim 22 that is disposed between the flange 10 and the body disk and receives the bolts 12 therethrough. The base 20 is perfectly flat and its periphery extends nearly to the rim mounting base 13 and is there provided with an inwardly turned rim portion 23 with an outwardly flared edge 24 that seats tightly against the inner edge of the flange 13. Lugs 25 are disposed at intervals between the flange 13 and rim 23 and these are secured to the flange 13 and receive the bolts 18 which attach the rim retaining lugs 17.

Located within the drum is an annular disk of friction material 26, such as pressed fabric or fibre. This lies flatly against the inner surface of the drum base and is retained freely in place by means of a small retaining ring 27 that is threaded onto the inner end portion of the hub 21 of the drum.

Cast integral with the steering knuckle 3 is a drum cover plate, or disk, 28; the inner surface of which lies in a plane that is perpendicular to the axis of the wheel and spindle and parallel with the plane of the inner surface of the drum base 20. This disk 28 has a peripheral rim 29 that fits revolubly within the inturned flange or rim 23 of the drum so as to provide a dust and weather proof joint. Fitted within the cover is a braking disk, or plate, 30, that is movable from and toward the base of the drum but is held against rotation by means of a plurality of peripheral extensions 31 that are slidable within grooves 32 in the inner surface of the drum cover flange 29. Movement of this clamping disk against the friction material 26 clamps the latter against the base of the rotating drum and effect the braking action.

The plate 30 is yieldably held disengaged from the friction material by means of a plurality of small coiled springs 35, (see Figure 1), which seat against the outer face of the cover plate and bear against nuts 36 threaded onto pins 37 that are fixed to the plate and which extend outwardly through openings 38 in the cover plate. These springs and bolts are enclosed within caps or covers 39 fixed by screws 40 to the cover, as shown in Figures 1 and 2.

The means whereby the braking disk 30 is actuated inwardly against the friction member to effect the braking action consists of a ring 44 that is slidably fitted within an annular groove 45 formed in the inner face of the drum cover concentric with the spindle. This ring is provided at regular intervals with cam surfaces 46 that engage in opposed relation with cam lugs 47 formed on the outer side of the braking disk 30 so that by rotatable movement of the ring, the disk will be actuated inwardly against the friction material and the latter clamped against the drum base to thereby apply the brake.

The ring 44 is provided with an outwardly projecting pin 50 that extends through an arcuate slot 51 in the cover and pivotally mounted on the cover by means of a pivot pin 52 is a lever 53 having a slot 54 wherein the pin 50 extends. Mounted on the cover is a cylinder 55 having a pipe 56 connected to one end thereof for the application of a fluid pressure medium and containing a piston 57 connected by a piston rod 58 with the lever 53. A coiled spring 60 contained within the cylinder bears outwardly against the piston to thereby retain the brake parts in released relation.

Assuming that the device is so constructed, its operation is as follows: With the parts in position, as shown in Figures 1 and 2, when it is desired to apply the brake, the operator admits a pressure medium to cylinder 55 to cause piston 57 to be forced inwardly, causing lever 53 to swing on its mounting and to cause the ring 44 to be shifted so that its cams 46 acting against the cams 47 of the clamping disk cause the disk to be clamped in braking contact against the friction plate 26. The braking pressure may be regulated by the operator by the admittance of the pressure medium to the cylinder.

When the pressure medium is released from the cylinder, the spring 60 moves the piston and braking ring 44 back to normal position and springs 35 draw the pressure disk away from the friction disk 26.

It is to be noted that this brake mechanism not only provides a greater braking surface than is usually provided but also permits easy and quick repairing, since, for replacement of the friction disk 26, it is only necessary to remove bolts 12 and withdraw the wheel outwardly from the hub, then remove the small ring 27 and withdraw the disk 26 which is not attached in any way to the drum except as held by the ring 27. In repair or replacement of brake parts the wheel hub does not need be removed from the spindle.

Having thus described my invention, what I claim as new therein and desire to secure by Letters Patent, is:

1. In a vehicle brake, a drum fixed coaxially to a wheel of the vehicle to revolve therewith, a friction disc fitted loosely within the base of the drum, a non-rotative cover for the drum supported from the wheel axle and provided with a concentric groove formed within its inner face, a ring fitted revolubly in said groove and provided with a plurality of cam surfaces, a braking disk supported from the inner face of the cover plate and provided with cam surfaces adapted to engage in opposed relation with the cams on said ring, yieldable means for normally retaining the braking disk disengaged from the friction disk, a stud fixed in said ring and extending outwardly through a slot in the cover plate, a lever pivotally attached at one end to the cover and operatively connected at its other end to the stud and manually controllable means for actuating said lever to rotate the ring to cause the braking disk to be clamped against the friction disk.

2. The combination with a vehicle wheel having a hub and rim of a brake mechanism comprising a drum fixed to the wheel coaxially of the hub; said drum having a hub portion with an inturned flange for receiving attaching bolts therethrough and having a peripheral flange, a non-rotative cover for the drum supported from the wheel axle and having a peripheral flange fitted within the flange of the drum to form a dust proof joint; said cover plate flange being provided interiorly with a plurality of transverse grooves, and said plate having a circular groove in its inner face, a disk of friction material fitted loosely within the base of the drum about the drum hub, a ring threaded onto said hub to retain the said friction disk in place, a braking disk disposed within the cover plate having projecting peripheral portions slidable in said flange grooves, and provided on its outer face with a plurality of cam surfaces, a ring revolubly fitted in said cover plate groove, and having cams thereon in opposed relation to the braking disk cams, yieldable means normally retaining the braking disk disengaged from the friction disk and means for rotating the ring to clamp the braking disk against the friction disk.

Signed at Seattle, King County, Washington, this 4th day of March, 1926.

WILLIAM R. McDONNELL.